(12) United States Patent
Jeong et al.

(10) Patent No.: US 9,542,837 B2
(45) Date of Patent: Jan. 10, 2017

(54) ULIFECARE MANAGEMENT SERVICE METHOD AND DEVICE USING ADAPTIVE CONTROL PROTOCOL FOR USN INTERFACE

(71) Applicant: Electronics and Telecommunications Research Institute, Daejeon (KR)

(72) Inventors: Eun Ju Jeong, Daejeon (KR); Won Ick Jang, Daejeon (KR); Sung Jae Yun, Daejeon (KR); Soon Mo Kim, Bucheon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/615,469

(22) Filed: Feb. 6, 2015

(65) Prior Publication Data
US 2015/0228186 A1     Aug. 13, 2015

(30) Foreign Application Priority Data
Feb. 13, 2014   (KR) .................. 10-2014-0016384

(51) Int. Cl.
G08C 17/02     (2006.01)
H04Q 9/00      (2006.01)

(52) U.S. Cl.
CPC ............. *G08C 17/02* (2013.01); *H04Q 9/00* (2013.01); *G08C 2201/42* (2013.01)

(58) Field of Classification Search
CPC ........ G08C 17/02; G08C 2201/42; H04Q 9/00
See application file for complete search history.

(56) References Cited

U.S. PATENT DOCUMENTS

| | | | | |
|---|---|---|---|---|
| 8,176,803 | B1 * | 5/2012 | Willett ................. | G01D 3/0365 340/870.01 |
| 2008/0094205 | A1 * | 4/2008 | Thorn .................... | H04L 12/66 340/539.1 |
| 2009/0058639 | A1 * | 3/2009 | Tanaka .................. | G01D 21/00 340/539.22 |
| 2010/0135211 | A1 * | 6/2010 | Park ..................... | H04L 12/2825 370/328 |

(Continued)

FOREIGN PATENT DOCUMENTS

| | | | |
|---|---|---|---|
| KR | 20110087372 A | * | 8/2011 |
| KR | 10-1095793 B1 | | 12/2011 |
| KR | 10-2013-0087990 A | | 8/2013 |

*Primary Examiner* — Hirdepal Singh
(74) *Attorney, Agent, or Firm* — Rabin & Berdo, P.C.

(57) ABSTRACT

A control method of a gateway communicating with at least one sensor and a service server is provided. The control method may include receiving, from the at least one sensor, first information comprising at least one of bioinformation, disaster prevention information, and public information, transmitting the first information to the service server when the first information meets a first standard, or processing the first information in a data format of the first standard and transmitting the processed first information to the service server when the first information does not meet the first standard, receiving, from the service server, a control command to control the at least one sensor, and transmitting the control command to a sensor corresponding to the control command.

19 Claims, 13 Drawing Sheets

(56) References Cited

U.S. PATENT DOCUMENTS

| | | | | |
|---|---|---|---|---|
| 2011/0084850 A1* | 4/2011 | Jiang | ................ | H04Q 9/00 340/870.16 |
| 2012/0050047 A1* | 3/2012 | Kim | ................ | A61B 5/0004 340/573.1 |
| 2012/0289787 A1* | 11/2012 | Kurgan | ................ | G06F 19/3418 600/300 |
| 2014/0043149 A1* | 2/2014 | Cowan | ................ | A61N 1/3993 340/12.5 |
| 2014/0266684 A1* | 9/2014 | Poder | ................ | G08B 25/003 340/521 |
| 2015/0059086 A1* | 3/2015 | Clough | ................ | G08C 17/02 5/83.1 |
| 2015/0116086 A1* | 4/2015 | Kim | ................ | G06F 21/32 340/5.83 |
| 2015/0350751 A1* | 12/2015 | Mc Cleland | ................ | B81B 7/02 340/3.31 |

* cited by examiner

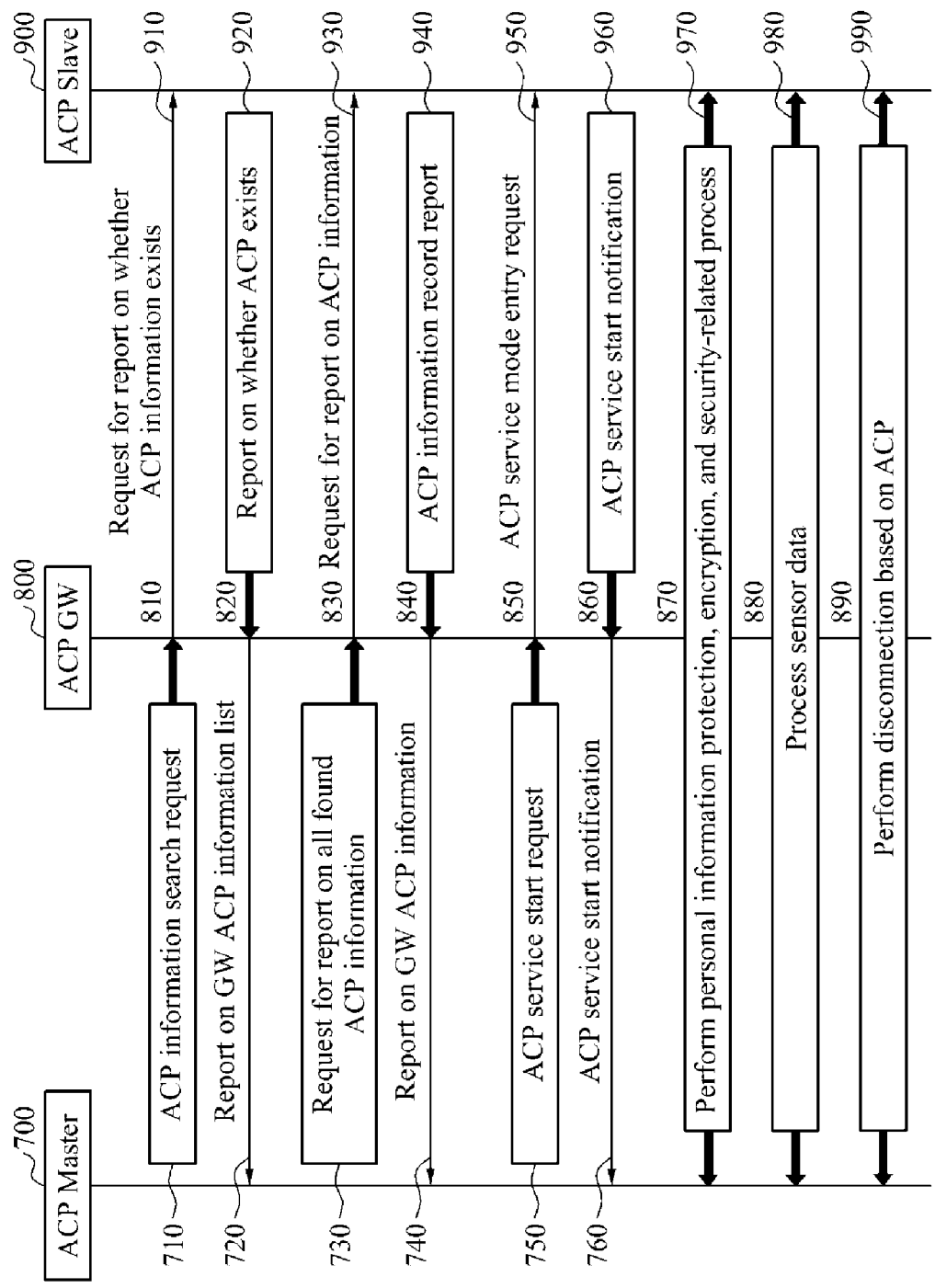

FIG. 8

```
CREATE TABLE [dbo].[ACP_Profile_device](
    [Idx] [int] IDENTITY(1,1) NOT NULL,
    [ID] [varchar](14) NULL,
    [RowID] [varchar](25) NULL,
    [Dev_Name] [varchar](20) NULL,
    [Dev_Type] [varchar](20) NULL,
    [Dev_Serial] [varchar](20) NULL,
    [Dev_Address] [varchar](20) NULL,
    [Dev_Network] [varchar](20) NULL,
    [Dev_MAC] [varchar](20) NULL,
    [Dev_URL] [varchar](20) NULL,
    [Client_Name] [varchar](20) NULL,
    [Client_Type] [varchar](20) NULL,
    [Client_Serial] [varchar](20) NULL,
    [Client_Address] [varchar](20) NULL,
    [Client_Network] [varchar](20) NULL,
    [Client_MAC] [varchar](20) NULL,
    [Client_URL] [varchar](20) NULL,
    [Server_Name] [varchar](20) NULL,
    [Server_Type] [varchar](20) NULL,
    [Server_Serial] [varchar](20) NULL,
    [Server_Address] [varchar](20) NULL,
    [Server_Network] [varchar](20) NULL,
    [Server_MAC] [varchar](20) NULL,
    [Server_URL] [varchar](20) NULL,
    [RegDay] [datetime] NULL,
    [TestDay] [datetime] NULL,
CONSTRAINT [PK_ACP_Profile_device] PRIMARY KEY CLUSTERED
(
    [Idx] ASC
)WITH (PAD_INDEX = OFF, STATISTICS_NORECOMPUTE = OFF, IGNORE_DUP_KEY= OFF, ALLOW_ROW_LOCKS = ON, ALLOW_PAGE_LOCKS = ON) ON [PRIMARY]
) ON [PRIMARY]
```

FIG. 9

```
CREATE TABLE [dbo].[ACP_Profile_client](
    [Idx] [int] IDENTITY(1,1) NOT NULL,
    [ID] [varchar](14) NULL,
    [RowID] [varchar](25) NULL,
    [Name] [varchar](20) NULL,
    [Dev_Number] [varchar](20) NULL,
    [Client_Name] [varchar](20) NULL,            [Server_Name] [varchar](20) NULL,
    [Client_Type] [varchar](20) NULL,            [Server_Type] [varchar](20) NULL,
    [Client_Serial] [varchar](20) NULL,          [Server_Serial] [varchar](20) NULL,
    [Client_Address] [varchar](20) NULL,         [Server_Address] [varchar](20) NULL,
    [Client_Network] [varchar](20) NULL,         [Server_Network] [varchar](20) NULL,
    [Client_MAC] [varchar](20) NULL,             [Server_MAC] [varchar](20) NULL,
    [Client_URL] [varchar](20) NULL,             [Server_URL] [varchar](20) NULL,
    [RegDay] [datetime] NULL,
    [TestDay] [datetime] NULL,
CONSTRAINT [PK_ACP_Profile_device] PRIMARY KEY CLUSTERED
(
    [Idx] ASC
)WITH (PAD_INDEX = OFF, STATISTICS_NORECOMPUTE = OFF, IGNORE_DUP_KEY= OFF, ALLOW_ROW_LOCKS = ON, ALLOW_PAGE_LOCKS = ON) ON [PRIMARY]
) ON [PRIMARY]
```

FIG. 10

```
CREATE TABLE [dbo].[ACP_Profile_server](
    [Idx] [int] IDENTITY(1,1) NOT NULL,
    [ID] [varchar](14) NULL,
    [RowID] [varchar](25) NULL,
    [Name] [varchar](20) NULL,

[Server_Name] [varchar](20) NULL,
    [Server_Type] [varchar](20) NULL,
    [Server_Serial] [varchar](20) NULL,
    [Server_Address] [varchar](20) NULL,
    [Server_Network] [varchar](20) NULL,
    [Server_MAC] [varchar](20) NULL,
    [Server_URL] [varchar](20) NULL,

[RegDay] [datetime] NULL,
    [TestDay] [datetime] NULL,
CONSTRAINT [PK_ACP_Profile_device] PRIMARY KEY CLUSTERED
(
    [Idx] ASC
)WITH (PAD_INDEX = OFF, STATISTICS_NORECOMPUTE = OFF, IGNORE_DUP_KEY = OFF, ALLOW_ROW_LOCKS = ON, ALLOW_PAGE_LOCKS = ON) ON [PRIMARY]
) ON [PRIMARY]
```

FIG. 11

| Column Name | Data Type | Allow Nulls |
|---|---|---|
| Idx | int | ☐ |
| ID | varchar(14) | ☑ |
| RowID | varchar(25) | ☑ |
| Name | varchar(20) | ☑ |
| mDate | datetime | ☑ |
| RowID_localkey | varchar(100) | ☑ |
| height | varchar(100) | ☑ |
| weight | varchar(100) | ☑ |
| gender | varchar(100) | ☑ |
| age | varchar(100) | ☑ |
| bmr | varchar(100) | ☑ |
| target_cal | varchar(100) | ☑ |
| total_cal | varchar(100) | ☑ |
| act_cal | varchar(100) | ☑ |
| target_steps | varchar(100) | ☑ |
| step_width | varchar(100) | ☑ |
| distance | varchar(100) | ☑ |
| hour_step | varchar(MAX) | ☑ |
| regDay | datetime | ☑ |

FIG. 12

|  | Column Name | Data Type | Allow Nulls |
|---|---|---|---|
|  | Idx | int | ☐ |
|  | ID | varchar(14) | ☑ |
|  | RowID | varchar(25) | ☑ |
|  | Name | varchar(20) | ☑ |
|  | mDate | datetime | ☑ |
|  | HeartRate | varchar(100) | ☑ |
|  | Battery | varchar(100) | ☑ |
|  | regDay | datetime | ☑ |

FIG. 13

|  | Column Name | Data Type | Allow Nulls |
|---|---|---|---|
| 🔑 | Idx | int | ☐ |
|  | ID | varchar(14) | ☑ |
|  | RowID | varchar(25) | ☑ |
|  | Name | varchar(20) | ☑ |
|  | Uro | decimal(7, 3) | ☑ |
|  | Glu | decimal(7, 3) | ☑ |
|  | Bil | decimal(7, 3) | ☑ |
|  | Ket | decimal(7, 3) | ☑ |
|  | SG | decimal(7, 3) | ☑ |
|  | OB | decimal(7, 3) | ☑ |
|  | pH | decimal(7, 3) | ☑ |
|  | Pro | decimal(7, 3) | ☑ |
|  | Nit | decimal(7, 3) | ☑ |
|  | Leu | decimal(7, 3) | ☑ |
|  | RegDay_Urine | datetime | ☑ |
|  | TestDay_Urine | datetime | ☑ |

ULIFECARE MANAGEMENT SERVICE METHOD AND DEVICE USING ADAPTIVE CONTROL PROTOCOL FOR USN INTERFACE

CROSS-REFERENCE TO RELATED APPLICATION

This application claims the benefit of Korean Patent Application No. 10-2014-0016384, filed on Feb. 13, 2014, in the Korean Intellectual Property Office, the disclosure of which is incorporated herein by reference.

BACKGROUND

1. Field of the Invention

Embodiments of the present invention relate to a gateway, sensor, and a service server based on a ubiquitous sensor network (USN) sensor access protocol.

2. Description of the Related Art

In information connection processing methods expressed as ubiquitous sensor networks (USNs), a variety of organized methods for classifying information used for various purposes exist. To this end, in domestic and foreign standardization organizations, standardization of bioinformation collection sensors employing information communication technologies has been promoted to minimize effort or interference of information users using information.

The International Organization for Standardization (ISO)/Institute of Electrical and Electronics Engineers (IEEE) 11073 series define standards of sensors and peripheral devices to collect bioinformation.

A bioinformation collection sensor may include, for example, a pulse oximeter (ISO/IEEE 11073-10404), a heart rate monitor (ISO/IEEE 11073-10406), a sphygmomanometer (ISO/IEEE 11073-10407), a thermometer (ISO/IEEE 11073-10408), a weighting scale (ISO/IEEE 11073-10415), a glucose meter (ISO/IEEE 11073-10417), and other sensors in a fitness field and a medical field (ISO/IEEE 11073-10441, -10442, -10471, and -10472). A basic framework protocol for the bioinformation collection sensor is defined in the ISO/IEEE 11073-20601, and standards for new equipment have been continuously defined. As a new bioinformation sensor, an urineanalyzing apparatus, and the like has been proposed.

Bioinformation collection apparatuses collect and transmit information through nonstandard information relay apparatuses, that is, gateways. The gateways may include, for example, personal computers (PCs), health information collection terminals, mobile phones, wired or wireless set-top boxes, and the like. Recently, smartphones, tablets, or gateways for exclusive use in Android, Apple's iOS, and Windows that meet an international standard have emerged.

SUMMARY

An aspect of the present invention provides a gateway to automatically transmit data collected by various sensors to a service server, to receive a control command from the service server, and to transfer the control command to a sensor, and provides a server operating based on the control command received from the service server.

According to an aspect of the present invention, there is provided a control method of a gateway communicating with at least one sensor and a service server, the control method including: receiving, from the at least one sensor, first information including at least one of bioinformation, disaster prevention information, and public information; transmitting the first information to the service server when the first information meets a first standard, or processing the first information in a data format of the first standard and transmitting the processed first information to the service server when the first information does not meet the first standard; receiving, from the service server, a control command to control the at least one sensor; and transmitting the control command to a sensor corresponding to the control command.

The transmitting may include determining whether the first information meets the first standard.

The control method may further include registering the at least one sensor.

The registering may include registering the at least one sensor based on registration information including at least one of a version of an adaptive control protocol (ACP), a name and a type of each of the at least one sensor, a gateway interface type, identification information, initial setup information, authentication information, and right information.

The transmitting may include determining, based on the registration information, whether a sensor transmitting the first information meets the first standard.

The control method may further include receiving identification information from the at least one sensor when the at least one sensor enters a network of the gateway, and transmitting the received identification information to the service server.

The control method may further include receiving at least one of initial setup information corresponding to the identification information and operating software version information, and updating the at least one of initial setup information and the operating software version information.

The control method may further include receiving an ACP information search request, and transmitting, to each of the at least one sensor, a request for a report on whether ACP information is included in each of the at least one sensor, in response to the ACP information search request.

The control method may further include receiving, from each of the at least one sensor, a report on whether each of the at least one sensor has an ACP of each of the at least one sensor, in response to the request for the report on whether the ACP information is included in each of the at least one sensor, and transmitting a report on an ACP information list to the service server.

The control method may further include receiving a request for a report on all ACP information found by the service server, and transmitting, to the at least one sensor, the request for the report of all the ACP information.

The control method may further include receiving an ACP information record report of each of the at least one sensor from each of the at least one sensor, and collecting the ACP information record report and transmitting the collected ACP information record report to the service server.

The control method may further include receiving an ACP service start request from the service server, and transmitting an ACP service mode entry request to the at least one sensor.

The control method may further include receiving an ACP service start notification from the at least one sensor, transmitting the ACP service start notification to the service server, and starting an ACP service.

According to another aspect of the present invention, there is provided a control method of a sensor communicating with a gateway communicating with a service server, the control method including: sensing first information including at least one of bioinformation, disaster prevention information, and public information; transmitting the first information to the gateway; receiving a control command relayed from the gateway, the control command being used to control the sensor; and controlling the sensor based on the control command.

The control method may further include registering the sensor in the gateway based on registration information including at least one of a version of an ACP, a name and a type of the sensor, a gateway interface type, identification information, initial setup information, authentication information, and right information.

The control method may further include receiving, from the gateway, a request for a report on whether ACP information is included in the sensor, and transmitting, to the gateway, a report on whether the sensor has an ACP of the sensor, in response to the request for the report on whether the ACP information is included in the sensor.

The control method may further include receiving, from the gateway, a request for a report on ACP information found by the service server, and transmitting, to the gateway, an ACP information record report of the sensor, in response to the request for the report on the ACP information.

The control method may further include receiving an ACP service mode entry request from the gateway, transmitting an ACP service start notification to the gateway, transmitting the ACP service start notification to the service server, and starting an ACP service.

According to another aspect of the present invention, there is provided a gateway communicating with at least one sensor and a service server, the gateway including: a communication unit to receive, from the at least one sensor, first information including at least one of bioinformation, disaster prevention information, and public information; and a controller to control the communication unit to transmit the first information to the service server when the first information meets a first standard, or to process the first information in a data format of the first standard and to transmit the processed first information to the service server when the first information does not meet the first standard, wherein the communication unit receives, from the service server, a control command to control the at least one sensor, and transmits the control command to a sensor corresponding to the control command.

According to another aspect of the present invention, there is provided a sensor communicating with a gateway communicating with a service server, the sensor including: a sensing unit to sense first information including at least one of bioinformation, disaster prevention information, and public information; a communication unit to transmit the first information to the gateway, and to receive a control command relayed by the gateway from the service server, the control command being used to control the sensor; and a controller to control the sensor based on the control command.

In the present disclosure, data received from various ubiquitous sensor network (USN) information collection sensors may be automatically transmitted to a server, may be stored and utilized, and each of sensors may be remotely controlled. Additionally, embodiments of the present invention may be applied to a sensor, a hub (or a gateway), a server, and a user personal computer (PC), or a whole system, for example, an end information processing system, a data hub, and the like, and an operation may be performed based on a set procedure and accordingly, an ACP for a USN sensor interface (Korean Patent Registration No. 10-1095793) enabling coping with a system change even in a dynamic and complex USN environment may be used. A user bioinformation sensor may design a life-cycle health management service using a pulse oximeter (ISO/IEEE 11073-10404), a heart rate monitor (ISO/IEEE 11073-10406), a sphygmomanometer (ISO/IEEE 11073-10407), a thermometer (ISO/IEEE 11073-10408), a weighting scale (ISO/IEEE 11073-10415), a glucose meter (ISO/IEEE 11073-10417), other sensors (ISO/IEEE 11073-10441, -10442, -10471, and -10472), a newly proposed in-vitro bioinformation collection apparatus, for example, a urineanalyzing apparatus, and arbitrary complex bioinformation collection sensors having functions of a series of equipment. To this end, an aspect of the present invention is to develop and implement an apparatus for applying an apparatus based on a standard framework (ISO/IEEE 11073-20601) of bioinformation measurement sensors to various existing operating systems (OSs) and an arbitrary OS that is to appear.

When the same type of technology is applied to a personal disaster prevention sensor, an automatic detection function by a sensor may be used as disaster prevention information while a resident goes out in a general home. As a personal disaster prevention sensor, a portable sensor that an individual may carry, for example, an outing sensor, an intrusion detection sensor, a gas sensor, a fire sensor, and the like may be applied.

Additionally, living environment variables as well as a general residential environment may be monitored and accordingly, a sensor used to measure liquid or materials to be monitored, a temperature/humidity sensor, a wind direction/wind speed sensor, an altitude sensor, a location information sensor, and the like may be defined as a public information sensor, and may be applicable using a protocol according to embodiments of the present invention. An open access scheme may be used to access public information of big data type provided by the government, and the public information may be used as extensible sensor information.

The present disclosure may be implemented to perform connection and management to enable various information collection sensors to be used without users' special interferences, using the ACP for USN sensor interface (Korean Patent Registration No. 10-1095793). Target sensors may be classified into equipment with an international standard protocol and equipment for which an international standard protocol has not yet been defined and accordingly, activation of industry conforming to a global standard may be induced and standardization of nonstandard equipment may be induced. Thus, an effect of securing consumers' convenience in use may be obtained along with activation of industry of a corresponding field.

The above sensors may be classified, based on a region of a user, into bioinformation sensors, disaster prevention information sensors, and public information sensors, and may be developed, which may have an effect of preparing a foundation to actively deal with personal service industries through personal information collection sensors that is automatically adaptable based on service desires of users in the era of cloud services and big data processing era that is arriving.

Along with the advent of the era of cloud services, data may be processed using a platform called big data. However, the data may provide source data, instead of following an existing standardized processing scheme, and accordingly a new method enabling data processing to meet consumer requirements has been provided. Accordingly, collection information of various sensors proposed in the present disclosure may be classified into bioinformation sensor data, disaster prevention information sensor data, public information sensor data, and expansion sensor information data, and may be processed. The method may have an effect of providing raw data of a format suitable for processing of big data.

By regulating a processing procedure to automatically synchronize, at a required point in time, an ACP acceptance service server characteristic file, an ACP acceptance gateway characteristic file, and an ACP acceptance apparatus characteristic file to process sensor equipment, affecting a service performance by a user when the user is involved between an apparatus and a service may be fundamentally prevented. Accordingly, prior knowledge or technical ability of a user may be prevented from having an influence on providing of services, if possible.

An individual bioinformation measurement sensor that is most standardized now may be first applied to a life-cycle health management service. A kidney disease measurement sensor that has not been yet standardized, but that is to be standardized may be practically implemented in the same method and accordingly, a base platform applicable by standardizing nonstandard sensors that are to be developed or to emerge may be developed.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 7 is a timing diagram to describe an operation of each of an ACP master, an ACP gateway, and an ACP slave according to an embodiment;

FIG. 8 illustrates a structure of a profile defined to apply a characteristic of an ACP sensor of FIG. 6 to an ACP;

FIG. 9 illustrates a structure of a profile that comprehensively defines a user profile DB that defines a characteristic of a gateway or the ACP client of FIG. 6, and a data DB used to integrally manage the ACP driver of FIG. 6;

FIG. 10 illustrates use of a structure of a profile that defines, as a DB, data for ACP processing managed by the ACP server of FIG. 6;

FIG. 11 illustrates a data structure of an amount-of-exercise measurement sensor to which an ACP used for a life-cycle health management service using a USN sensor access protocol with an adaptive control function is applied according to an embodiment;

FIG. 12 illustrates a data structure of a heart rate measurement sensor to which an ACP used for a life-cycle health management service using a USN sensor access protocol with an adaptive control function is applied according to an embodiment; and FIG. 13 illustrates a data structure of a kidney disease measurement sensor to which an ACP used for a life-cycle health management service using a USN sensor access protocol with an adaptive control function is applied according to an embodiment.

DETAILED DESCRIPTION

Figure 1:
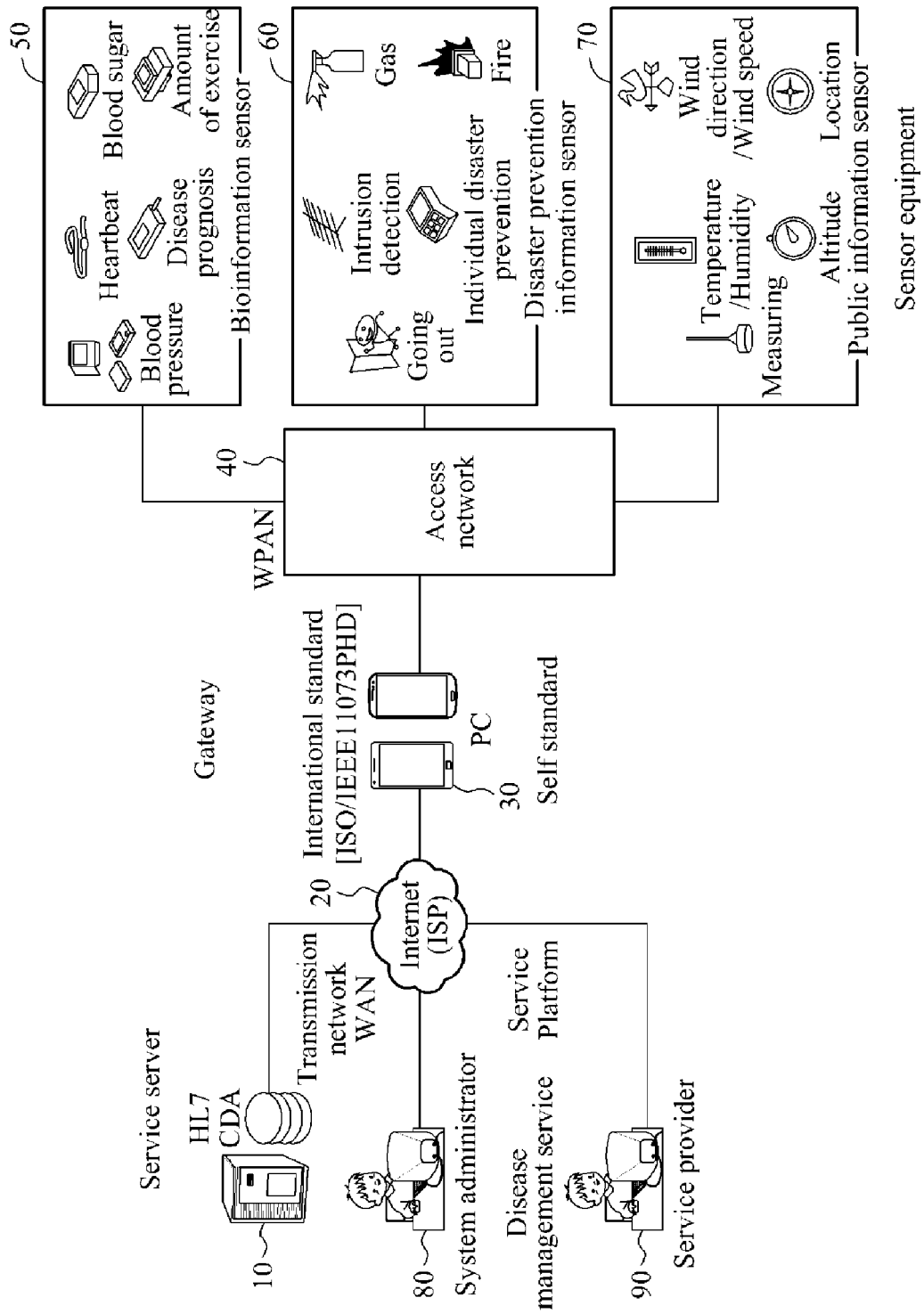
FIG. 1 is a diagram illustrating a structure of a ubiquitous sensor network (USN) system according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a structure of a ubiquitous sensor network (USN) system according to an embodiment.

As shown in FIG. 1, the USN system may include a service server 10, a gateway 30, and at least one sensor, for example, a bioinformation sensor 50, a disaster prevention information sensor 60 for individual use, and a public information sensor 70. The service server 10 may be connected to the gateway 30 via a transmission network 20. Additionally, the service server 10 may be connected to a system administrator 80 or a service provider 90 via the transmission network 20. The gateway 30 may be connected, via the transmission network 20, to at least one of the service server 10, the system administrator 80, and the service provider 90.

The gateway 30 may be connected to the at least one sensor via an access network 40.

The bioinformation sensor 50 may sense bioinformation. For example, the bioinformation sensor 50 may sense bioinformation including at least one of a blood pressure, a blood sugar, a temperature, a heartbeat, a body fat, an oxygen saturation, and an electrocardiogram of a user wearing the bioinformation sensor 50. The bioinformation sensor 50 may be a sensor conforming to the International Organization for Standardization (ISO)/Institute of Electrical and Electronics Engineers (IEEE) 11073 standard, or an independent sensor that does not conform to a specific standard.

The bioinformation sensor 50 may transmit the sensed bioinformation to the gateway 30 via the access network 40. The access network 40 may transmit and receive data to and from the gateway 30, and the at least one sensor. The access network 40 may be implemented by at least one of ZigBee communication, Bluetooth communication, a universal serial bus (USB) communication, medical implant communication service (MICS)/medical data service (MEDS) communication, Ethernet communication, and wireless fidelity (Wi-Fi) communication.

For example, the gateway 30 may include a communication unit, and a controller. The communication unit may transmit and receive a signal based on a communication scheme of the access network 40, and the controller may generate and process a signal to be transmitted and received or may perform an operation. Additionally, each of the at least one sensor may include a communication unit, and a controller. In each of the at least one sensor, the communication unit may transmit and receive a signal based on the communication scheme of the access network 40, and the controller may generate and process a signal to be transmitted and received or may perform an operation. Each of the at least one sensor may further include a sensing unit to sense predetermined information. In the following description, one of ordinary skill in the art may easily understand that signals may be transmitted and received by a communication unit of each of the gateway 30 and the at least one sensor, and that an operation may be performed or signals may be generated and processed by a controller of each of the gateway 30 and the at least one sensor.

The disaster prevention information sensor 60 may sense a personal hazard factor. For example, the disaster prevention information sensor 60 may sense information collected from surroundings of a residence or a body, or environment information different from bioinformation. The disaster prevention information sensor 60 may sense disaster prevention information associated with intrusion detection, going out, gas, fire, hurt from a fall, an accidental collision, and the like. The disaster prevention information sensor 60 may transmit the sensed disaster prevention information to the gateway 30 via the access network 40.

The public information sensor 70 may sense public information different from personal body information or hazard factor. For example, the public information sensor 70 may sense public information, for example, measuring, an altitude, global positioning system (GPS) information, a rainfall, a snowfall, a temperature, a humidity, an atmospheric pressure, a wind direction, a wind speed, a luminous intensity, and the like. In addition, the public information sensor 70 may sense public information provided through an open application programming interface (API) of a spread of population, a volume of traffic, an amount of precipitation, a temperature, a weather situation, a public transportation timetable, location information of a public institution, and the like. The public information sensor 70 may transmit the sensed public information to the gateway 30 via the access network 40.

In an example, the gateway 30 may transmit at least one of the received bioinformation, the received disaster prevention information, and the received public information to the service server 10 via the transmission network 20. The gateway 30 may transmit at least one of the received bioinformation, the received disaster prevention information, and the received public information to the service server 10, without processing.

In another example, the gateway 30 may process at least one of the received bioinformation, the received disaster prevention information, and the received public information in a predetermined data format, and may transmit the at least one processed information to the service server 10. For example, when bioinformation that does not meet the ISO/IEEE 11073 standard is received from the bioinformation sensor 50, the gateway 30 may process the received bioinformation in a data format of the ISO/IEEE 11073 standard, and may transmit the processed bioinformation to the service server 10. The gateway 30 may determine whether received information meets the ISO/IEEE 11073 standard, and may perform processing. Additionally, the gateway 30 may determine whether a sensor meets the ISO/IEEE 11073 standard, during registration of the sensor that will be described. The gateway 30 may process data received from a sensor that does not meet the ISO/IEEE 11073 standard in the data format of the ISO/IEEE 11073 standard.

The processing of bioinformation in the data format of the ISO/IEEE 11073 standard by the gateway 30 is merely an example. The gateway 30 may include a data format of the gateway 30 that is different from the data format of the ISO/IEEE 11073 standard and accordingly, may process collected data in the data format of the gateway 30 and may transmit the processed data to the service server 10.

In an example, every time data is received from the at least one sensor, the gateway 30 may transmit the received data to the service server 10. In another example, the gateway 30 may temporarily store the received data in a storage, for example a buffer, and the like, and may transmit the temporarily stored data to the service server 10 for every predetermined period. One of ordinary skill in the art may easily understand that the gateway 30 may temporarily store the received data in the storage until a user's delete command is input.

The service server 10 may be connected, via the transmission network 20, to at least one of the gateway 30, the system administrator 80 and the service provider 90. The service server 10 may store at least one of the bioinformation, the disaster prevention information and the public information that are received from the gateway 30. The service server 10 may include an interface to provide the system administrator 80 or the service provider 90 with at least one of the bioinformation, the disaster prevention information and the public information that are stored. The service server 10 may receive a data modification command, or a data analysis command through the interface. The service server 10 may modify or analyze data based on a received user command. The service server 10 may also receive a sensor control command through the interface. The service server 10 may transfer the received sensor control command to the gateway 30, and the sensor control command may be transferred through the gateway 30 to the at least one sensor. When a control command does not meet a specific standard, the gateway 30 may process the control command in a data format of the specific standard, and may transmit the processed control command.

Each of the at least one sensor may operate based on a received control command.

Figure 2:
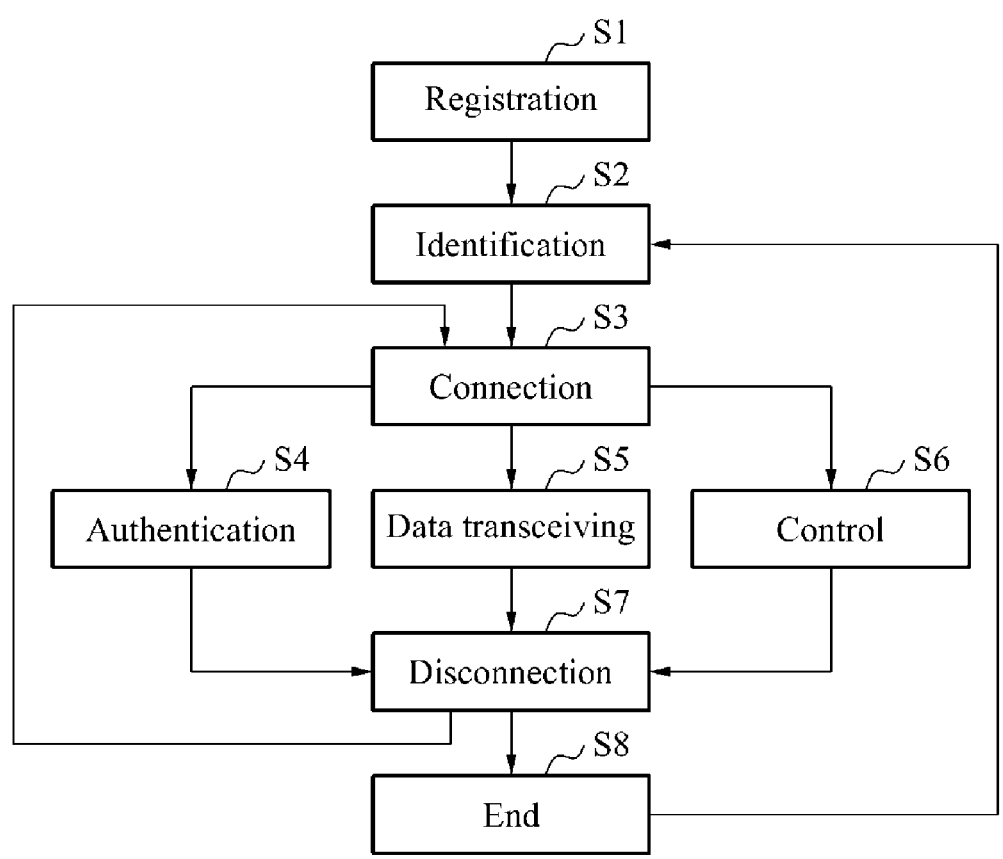
FIG. 2 is a flowchart illustrating an operation of the USN system of FIG. 1.

FIG. 2 is a flowchart illustrating an operation of the USN system of FIG. 1.

In operation S1, the service server 10 may register, in a management list, the at least one sensor that exists in the USN system. The service server 10 may perform registration based on registration information of each of the at least one sensor. The registration information may include at least one of a version of an ACP, a name and a type of each of the at least one sensor, a gateway interface type, identification information, initial setup information, authentication information, and right information. The gateway interface type may include, for example, a serial interface, a USB interface, a ZigBee communication interface, and a Bluetooth communication interface.

Operation S2 may be initiated when the at least one sensor and a user enter a USN. When the gateway 30 and the at least one sensor are physically connected to each other, the at least one sensor may transmit identification information of each of the at least one sensor to the gateway 30. The gateway 30 may transmit the received identification information to the service server 10. The service server 10 may transmit, to the gateway 30, operating software version information and initial setup information of each of the at least one sensor, in response to the identification information. At least one of the gateway 30 and the at least one sensor may perform an operating software updating procedure, or an initial setup procedure corresponding to the initial setup information. Additionally, the service server 10 may provide a login interface for a user. The user may perform a login procedure using the login interface provided in operation S2.

In operation S3, the at least one sensor may be connected to the gateway 30. Additionally, the gateway 30 may be connected to the service server 10. The user may log into the service server 10 and accordingly, the user and the service server 10 may be connected.

For example, when data from the at least one sensor is streaming information, peer-to-peer (P2P) connection between the user and the at least one sensor, or P2P connection between the gateway 30 and the user may be formed. In an embodiment, a user may input a sensor list that the user desires to receive in advance to the service server 10. When a sensor connection request is received from the gateway 30, the service server 10 may notify a corresponding user of the sensor connection request, and may enable connection to be completed.

When a connection procedure is completed and connection is set, the service server 10 may set a data storage space based on a characteristic of data from a sensor, or may mediate P2P connection.

Operation S4 may be performed when data measured by the at least one sensor corresponds to a plurality of users, not a single region or an individual. When a sensor is used for an individual, authentication of each individual may be performed in operation S4. For example, for authentication in operation S4, a radio frequency identification (RFID) tag may be used, or an input of sensor personal information may be received directly in the gateway 30.

In operation S5, the gateway 30 may receive data from the at least one sensor, and may transmit the data to the service server 10. The service server 10 may transfer the received data to a user. For example, the service server 10 may provide the user with the data using a push scheme.

In operation S6, the user may enter a control command to the service server 10. The service server 10 may transmit the received control command to the gateway 30, and the gateway 30 may relay the received control command to each of the at least one sensor. The control command may include sensor identifier information and accordingly, the gateway 30 may verify the control command and transmit the control command to only a corresponding sensor. The control command may include, for example, a command to start or stop data transceiving of a sensor, and the like, or may include sensing period setup information, data transceiving scheme change information, and the like.

In operation S6, the gateway 30, or the at least one sensor may provide a script or a web page to control the gateway 30, or the at least one sensor. The service server 10 may control the gateway 30, or the at least one sensor, based on the script or the web page.

In operation S7, the gateway 30 may transmit a disconnection request to the service server 10. In response to the disconnection request, the service server 10 may be disconnected from the gateway 30, and may provide a user with a disconnection result. The service server 10 may release a resource of a temporary storage space for data transceiving set in a server.

Operation S8 may be performed when the user logs out or when the at least one sensor escapes from the USN, due to powering off or malfunctions.

Figure 3:
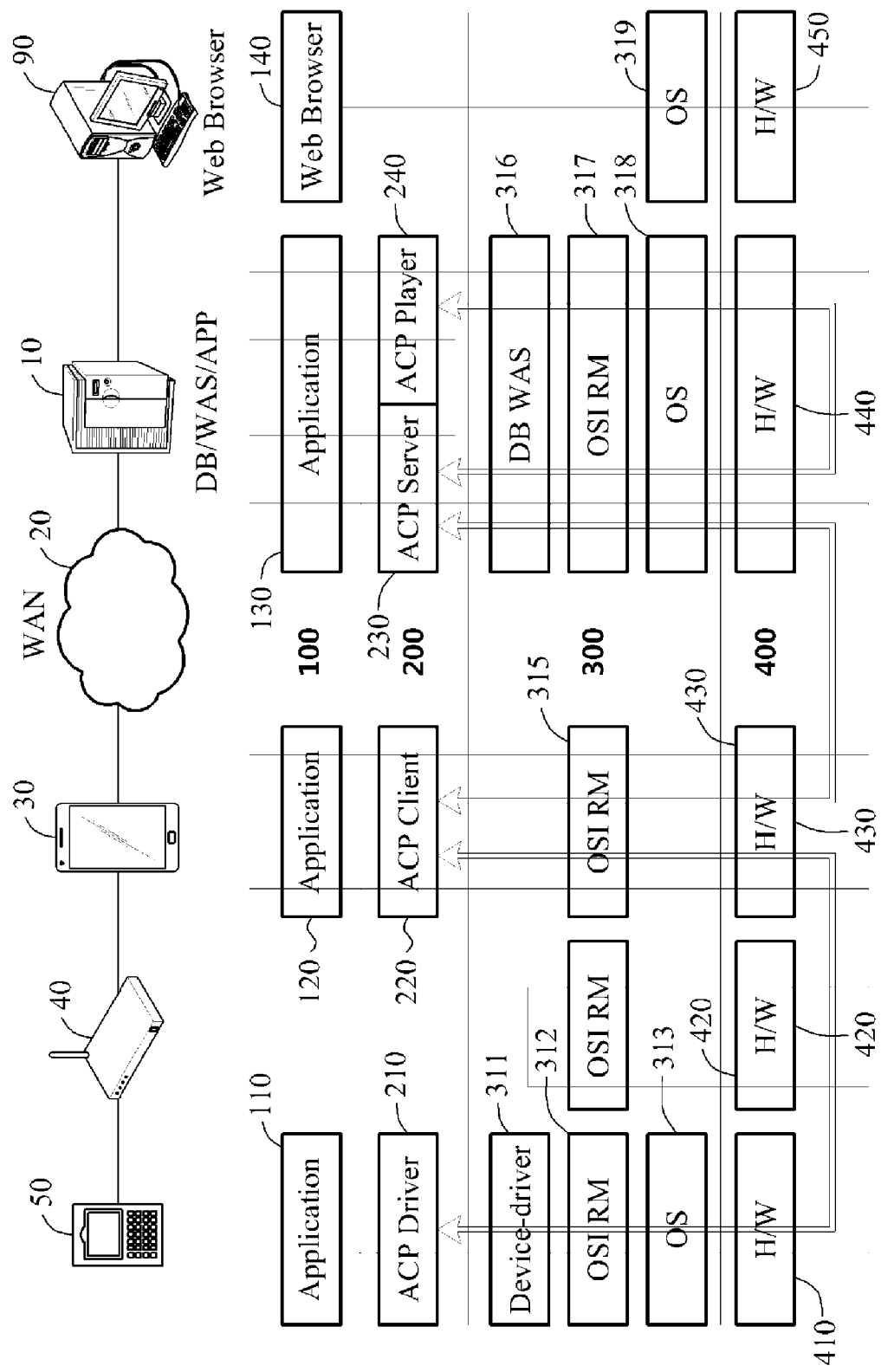
FIG. 3 is a diagram illustrating a hierarchical compatibility in an open systems interconnection (OSI) reference model (RM) according to an embodiment.

FIG. 3 is a diagram illustrating hierarchical compatibility in an open systems interconnection (OSI) reference model (RM) according to an embodiment.

As shown in FIG. 3, a sensor may sense at least one of bioinformation, disaster prevention information and public information by an application 110 executed in an application layer 100. The sensor may be, for example, the bioinformation sensor 50. Collected information may be processed through an ACP driver 210, a device-driver 311, an OSI RM 312 and an operating system (OS) 313. The processed information may be transmitted to hardware 420 of the access network 40 through hardware 410.

The information received in the hardware 420 may be transferred to an OSI RM 314, and may be transferred to hardware 430 of the gateway 30 by passing through the hardware 420 again.

The information received in the hardware 430 may be transferred to an ACP client 220 through an OSI RM 315. The ACP client 220 may transfer the information to an application 120 executed in the application layer 100.

The information may be transferred from the application 120 back to the hardware 430 through the ACP client 220 and the OSI RM 315. The hardware 430 may transfer the information to hardware 440 of the service server 10.

The service server 10 may receive the information through the hardware 440. The received information may be transferred to an ACP server 230 through an OS 318, an OSI RM 317, and a database (DB) web application server (WAS) 316. The ACP server 230 may transfer the received information to an application 130 executed in the application layer 100.

The application 130 may transfer the information to the ACP server 230, and the ACP server 230 may transfer the received information to an ACP player 240. The ACP player 240 may transfer the received information to the application 130, and the information may be transferred to the hardware 440 through the DB WAS 316, the OSI RM 317 and the OS 318.

The hardware 440 may transfer the information to hardware 450 of a user terminal 90. The information received in the hardware 450 may be transferred to a web browser 140 executed in the application layer 100, through an OS 319. A user may verify information sensed by the sensor based on the information provided in the web browser 140.

Additionally, the user may enter a sensor control command to the user terminal 90. The sensor control command may be transferred to the sensor through a process inverse to an information transfer process.

Figure 4:
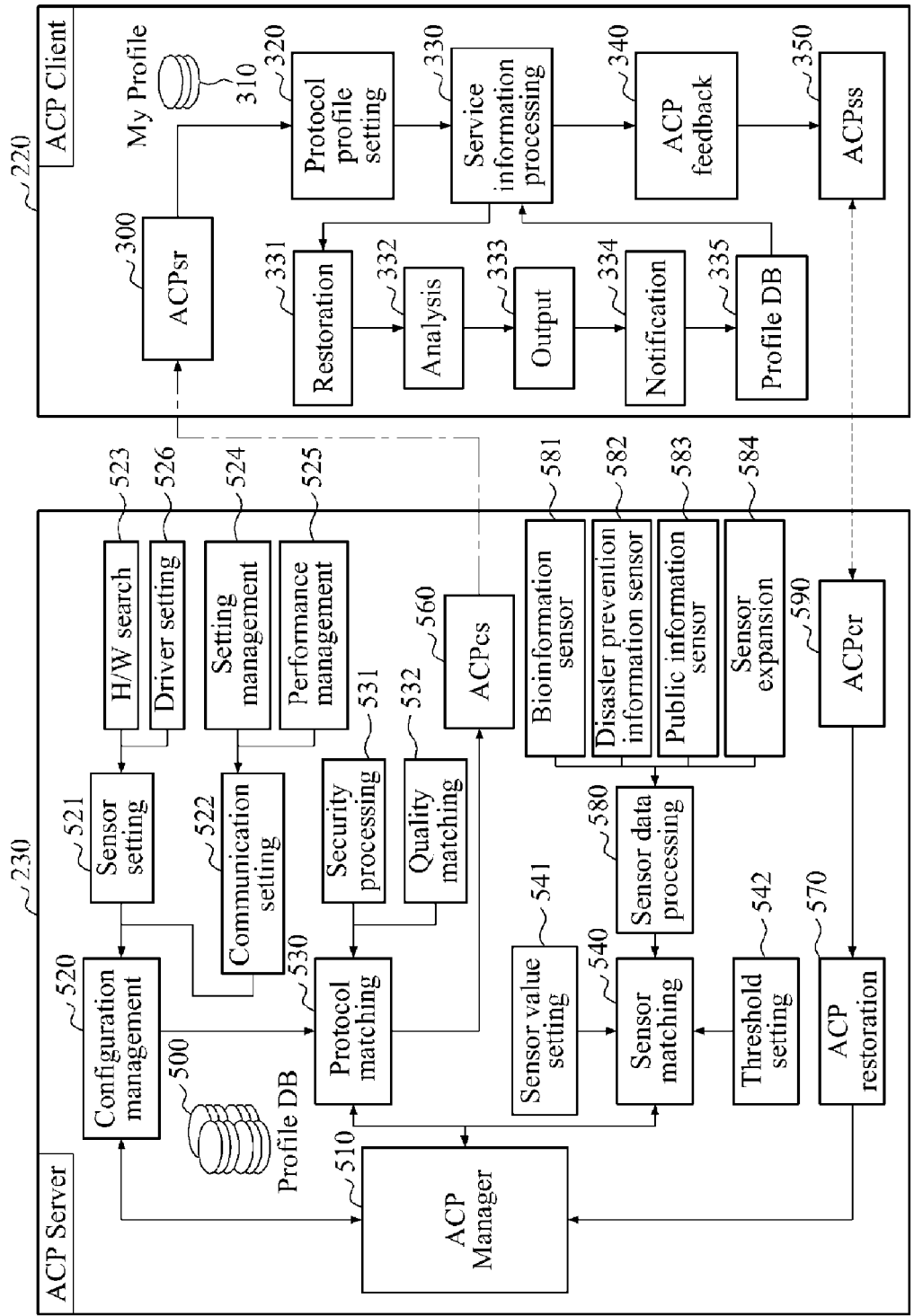
FIG. 4 is a block diagram illustrating a configuration of each of an adaptive control protocol (ACP) server and an ACP client of FIG. 3.

FIG. 4 is a block diagram illustrating a configuration of each of the ACP client 220 and the ACP server 230 of FIG. 3. As shown in FIG. 3, the ACP server 230 may be defined in the service server 10, and the ACP client 220 may be defined in the gateway 30.

As shown in FIG. 4, the ACP client 220 may include an ACPsr unit 300, a user profile DB 310, a protocol profile setting unit 320, a service information processing unit 330, a restoration unit 331, an analysis unit 332, an output unit 333, a notification unit 334, a profile DB 335, an ACP feedback unit 340, and an ACPss unit 350. The ACP server 230 may include a profile DB 500, a main processing unit 510 (that is, an ACP manager 510), a configuration management unit 520, a sensor setting unit 521, a communication setting unit 522, a hardware search unit 523, a setting management unit 524, a performance management unit 525, a driver setting unit 526, a protocol matching unit 530, a security processing unit 531, a quality matching unit 532, a sensor matching unit 540, a sensor value setting unit 541, a threshold setting unit 542, an ACPcs unit 560, a sensor data processing unit 580, a bioinformation sensor 581, a disaster prevention information sensor 582, a public information sensor 583, a sensor expansion unit 584, an ACP restoration unit 570, and an ACPcr unit 590.

The ACP client 220 may operate in the gateway 30 that processes an ACP function enabling an arbitrary terminal device to access an information service processing device while performing the ACP function.

The ACPsr unit 300 may receive an ACP parameter from the ACP server 230, may determine whether corresponding information is stored in the profile DB 310, and the protocol profile setting unit 320 may set a protocol profile based on a result of the determining, to enable an ACP to be accepted. The profile DB 310 may maintain synchronization of information with the profile DB 500.

The service information processing unit 330 may process data to which an ACP profile is applied. The restoration unit 331 may restore received data, and the analysis unit 332 may analyze the restored data based on an instruction translation table. The output unit 333 may output the analyzed data, and the notification unit 334 may transfer the data to a unit from which the data is received. An analyzed profile may be stored in the profile DB 335.

The ACP feedback unit 340 may transfer data to the ACPss unit 350, and may enable the data to be transferred to the ACPcr unit 590. The ACPss unit 350 may transfer an ACP profile processed by the service information processing unit 330 to the ACP server 230.

To process sensor information transmitted in a sensor device in all applications applying an ACP, the ACP server 230 may automatically process an appropriate ACP profile of a sensor device in which an ACP transmitted from the ACP client 220 is accepted, or may register an ACP profile enabling active communication between an application and a sensor device in which an ACP is not accepted, and may enable the ACP profile to be suited for the application.

The profile DB 500 may store all known profile information of ACP_Profile_device of FIG. 8, ACP_Profile_client of FIG. 9, and ACP_Profile_server of FIG. 10, to match all sensor devices that are connectable to an application. For example, when a sensor device does not accept an ACP, the sensor device may be registered in the profile DB 500 based on a defined procedure, and may be synchronized with the ACP client 220.

The ACP manager 510 may integrally manage an operation of the ACP server 230.

The configuration management unit 520 may include the sensor setting unit 521 configured to set a characteristic of a sensor device based on a profile of ACP_Profile_device, and the communication setting unit 522 of the sensor device.

The sensor setting unit 521 may include the hardware search unit 523 configured to search for a sensor device, and the driver setting unit 526 configured to match a sensor device.

The communication setting unit 522 may include the setting management unit 524 configured to set communication, and the performance management unit 525 configured to manage performance.

The protocol matching unit 530 may include the security processing unit 531 of an actually connected ACP sensor device, and the quality matching unit 532 configured to guarantee a service-level agreement (SLA), and may pass through the ACPcs unit 560 to perform protocol matching with the ACP client 220.

The sensor matching unit 540 may process sensor data based on a setting value of each of the sensor value setting unit 541 and the threshold setting unit 542. The sensor data processing unit 580 may include the bioinformation sensor 581, the disaster prevention information sensor 582, and the public information sensor 583 based on classification of sensor devices, and the sensor expansion unit 584 used to accommodate various sensors expected to emerge.

The ACP restoration unit 570 may restore an ACP while communicating with the ACPss unit 350 of the ACP client 220.

Figure 5:
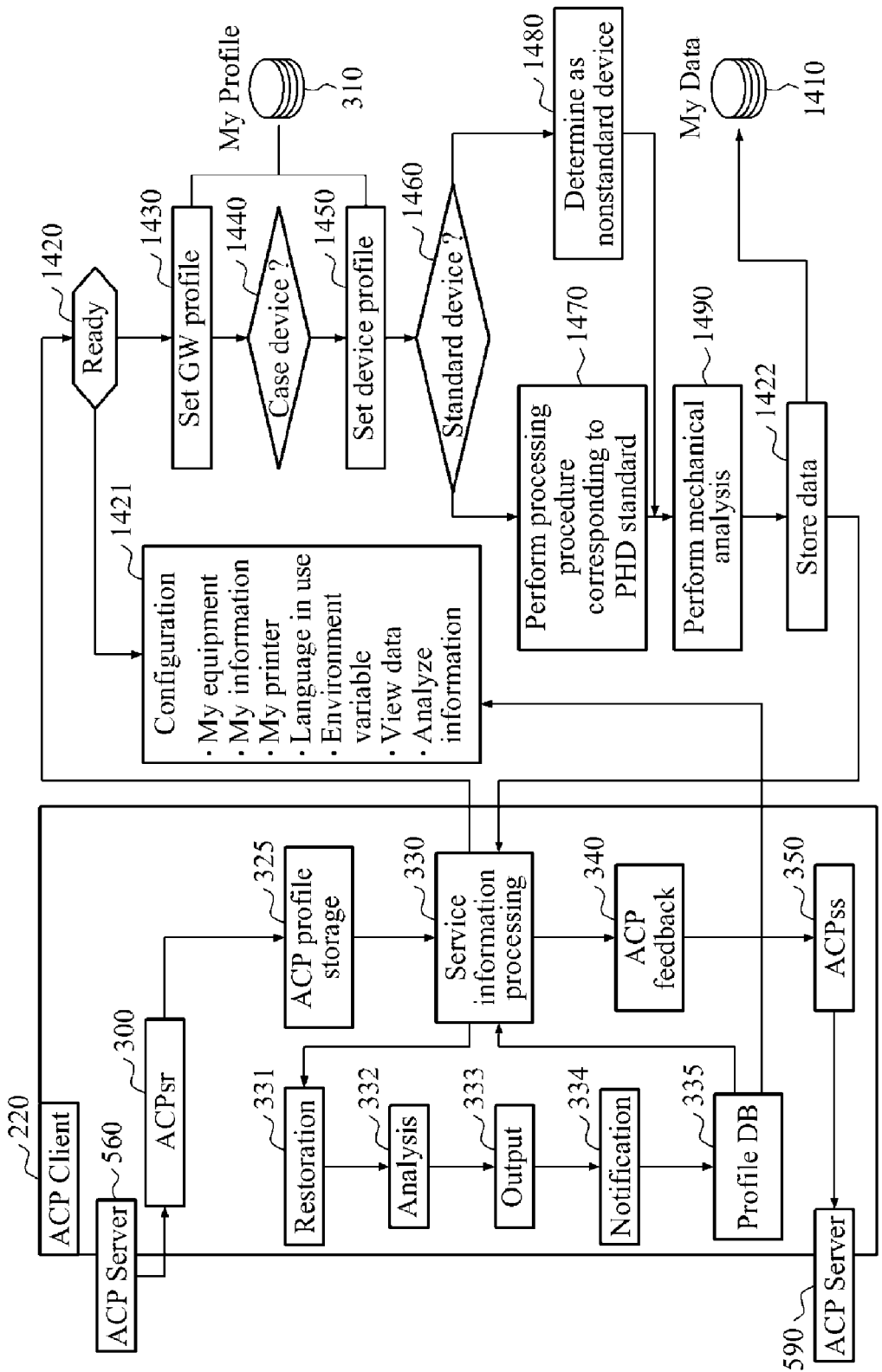
FIG. 5 is a flowchart illustrating an operation of the ACP client of FIG. 3.

FIG. 5 is a flowchart illustrating an operation of the ACP client 220 of FIG. 3.

Referring to FIG. 5, in operation 1420, service information processed by the service information processing unit 330 may be provided. In operation 1421, configuration may be performed based on a profile provided from the profile DB 335. In operation 1421, equipment information, user information, printer information, language information, environment variable information, and data information may be set, and data may be analyzed.

In operation 1430, a gateway profile may be set. In operation 1440, whether a device is a case device may be determined.

When a device profile is set in operation 1450, a user profile may be generated and stored in the user profile DB 310.

In operation 1460, whether a device is a standard device may be determined. When the device is determined as the standard device, a processing procedure corresponding to a personal health device (PHD) standard may be performed in operation 1470. When the device is determined as a nonstandard device, the device may be individually managed as a nonstandard device in operation 1480.

The ACP client 220 may perform mechanical analysis in operation 1490, and may store data in operation 1422. Accordingly, a data DB 1410 may be generated.

Figure 6:
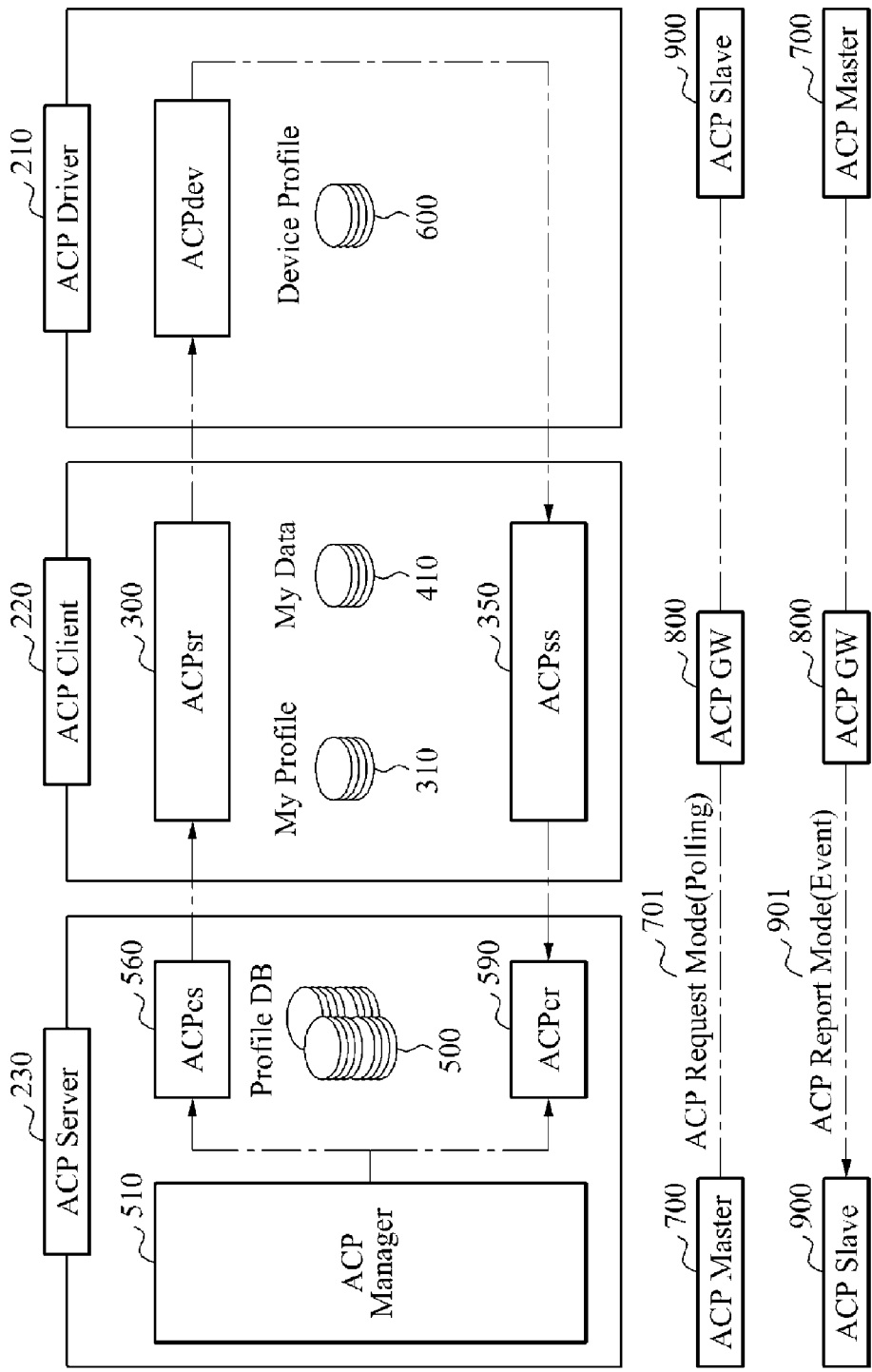
FIG. 6 is a diagram illustrating an operation of each of an ACP driver, the ACP client, and the ACP server of FIG. 3.

FIG. 6 illustrates an operation of each of the ACP driver 210, the ACP client 220, and the ACP server 230.

The ACP server 230 may include the ACP manager 510, the ACPcs unit 560, and the ACPcr unit 590. The ACP manager 510 may control an operation of each of the ACPcs unit 560 and the ACPcr unit 590, and may generate the profile DB 500.

The ACP client 220 may include the ACPsr unit 300, and the ACPss unit 350, and may generate and manage the user profile DB 310 and the data DB 1410.

The ACP driver 210 may include an ACPdev unit 309, and may generate and manage a device profile 600 of the ACP driver 210.

FIG. 6 illustrates an overall operation procedure among the ACP driver 210, the ACP client 220, and the ACP server 230 that are configured to enable an application, to which an ACP is applied, to be consistently executed. The ACP server 230 may be operated by the ACP manager 510 that performs integrated management as described with reference to FIG. 4. To perform communication with the ACP client 220, a pair of the ACPcs unit 560 and the ACPsr unit 300, and a pair of the ACPcr unit 590 and the ACPss unit 350 may be formed as transceiving pairs. The ACP driver 210 may manage the device profile 600, using the ACPdev unit 309. The ACP client 220 may collect the device profile 600 of the ACP driver 210 connected to the ACP client 220, and may store the device profile 600 in the data DB 1410. The ACP client 220 may manage a profile of the ACP client 220 in the user profile DB 310, and the profile may be integrally managed in the profile DB 500 of the ACP server 230.

Synchronization of the profile DB 500 may be performed among the ACP driver 210, the ACP client 220, and the ACP server 230, using two schemes, that is, a polling mode (for example, an ACP request mode 701) and an event inducing mode (for example, an ACP report mode 901). The two schemes may be interchangeably performed.

An operating procedure of an ACP may include the ACP request mode 701 based on a periodic polling mode, and the ACP report mode 901 operated based on an event. In the ACP request mode 701, data may be acquired by periodically polling data from an ACP gateway 800. Additionally, in the ACP report mode 901, the ACP gateway 800 may report data. The ACP gateway 800 may store collected data in a buffer and may periodically report the data, or may perform real-time streaming.

FIG. 7 illustrates a timing diagram to describe an operation of each of an ACP master 700, the ACP gateway 800, and an ACP slave 900 according to an embodiment.

In operation 710, the ACP master 700 may propagate an ACP information search request to the ACP gateway 800. The ACP gateway 800 may receive the ACP information search request, and may transmit, to the ACP slave 900, a request for a report on whether ACP information is included in the ACP slave 900 in operation 910.

In response to the request for the report on whether the ACP information is included in the ACP slave 900, the ACP slave 900 may report whether the ACP slave 900 has an ACP in operation 920. The ACP gateway 800 may report a gateway ACP information list in operation 720.

In operation 830, the ACP master 700 may transmit, to the ACP gateway 800, a request for a report on all found ACP information. In operation 930, the ACP gateway 800 may transmit a request for a report on ACP information to the ACP slave 900.

In operation 840, the ACP slave 900 may transmit, to the ACP gateway 800, an ACP information record report of the ACP slave 900. In operation 740, the ACP gateway 800 may report ACP information to the ACP master 700.

In operation 850, the ACP master 700 may transmit an ACP service start request to the ACP gateway 800. In operation 950, in response to the ACP service start request, the ACP gateway 800 may transfer an ACP service mode entry request to the ACP slave 900.

In operation 860, the ACP slave 900 may start an ACP service, and may transmit an ACP service start notification to the ACP gateway 800. In operation 760, the ACP gateway 800 may transmit the received ACP service start notification to the ACP master 700.

The ACP master 700, the ACP gateway 800, and the ACP slave 900 may perform personal information protection, encryption, and security-related process in operation 970, may transmit and receive sensor data, and may process the sensor data in operation 980. When operations 710 to 980 are completed, the ACP master 700, the ACP gateway 800, and the ACP slave 900 may be disconnected from each other based on an ACP in operation 990.

The ACP master 700 and the ACP gateway 800 may be implemented as the service server 10 and the gateway 30, respectively. The ACP slave 900 may be implemented as the bioinformation sensor 50, the disaster prevention information sensor 60, or the public information sensor 70.

FIG. 8 illustrates a structure of the device profile 600 defined to apply a characteristic of an ACP sensor of FIG. 6 to an ACP.

FIG. 9 illustrates a structure of a profile that comprehensively defines the user profile DB 310 that defines a characteristic of a gateway or the ACP client 220 of FIG. 6, and the data DB 1410 used to integrally manage the ACP driver 210.

FIG. 10 illustrates use of a structure of a profile that defines, as a DB, data for ACP processing managed by the ACP server 230 of FIG. 6.

FIG. 11 illustrates a data structure of an amount-of-exercise measurement sensor to which an ACP used for a life-cycle health management service using a USN sensor access protocol with an adaptive control function is applied according to an embodiment.

FIG. 12 illustrates a data structure of a heart rate measurement sensor to which an ACP used for a life-cycle health management service using a USN sensor access protocol with an adaptive control function is applied according to an embodiment.

FIG. 13 illustrates a data structure of a kidney disease measurement sensor to which an ACP used for a life-cycle health management service using a USN sensor access protocol with an adaptive control function is applied according to an embodiment.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A control method of a gateway communicating with at least one sensor and a service server, the control method comprising:
   receiving, from the at least one sensor, first information comprising at least one of bioinformation, disaster prevention information, and public information;
   transmitting the first information to the service server when the first information meets a first standard, and processing the first information into a data format of the first standard and transmitting the processed first information to the service server when the first information does not meet the first standard;
   receiving, from the service server, a control command to control the at least one sensor;
   transmitting the control command to a sensor corresponding to the control command;
   receiving an adaptive control protocol (ACP) information search request; and
   transmitting, to the at least one sensor, a request for a report on whether ACP information is included in the at least one sensor, in response to the ACP information search request.

2. The control method of claim 1, wherein the transmitting comprises determining whether the first information meets the first standard.

3. The control method of claim 1, further comprising:
   registering the at least one sensor.

4. The control method of claim 3, wherein the registering comprises registering the at least one sensor based on registration information comprising at least one of a version of an adaptive control protocol (ACP), a name and a type of each of the at least one sensor, a gateway interface type, identification information, initial setup information, authentication information, and right information.

5. The control method of claim 4, wherein the transmitting comprises determining, based on the registration information, whether a sensor transmitting the first information meets the first standard.

6. The control method of claim 1, further comprising:
receiving identification information from the at least one sensor when the at least one sensor enters a network of the gateway; and
transmitting the received identification information to the service server.

7. The control method of claim 6, further comprising:
receiving at least one of initial setup information corresponding to the identification information and operating software version information, and updating the at least one of initial setup information and the operating software version information.

8. The control method of claim 1,
wherein the at least one sensor comprises at least one of a first sensor in which an ACP is not accepted and at least one of a second sensor in which the ACP is accepted.

9. The control method of claim 1, further comprising:
receiving, from the at least one sensor, a report on whether the at least one sensor has the ACP information corresponding to the at least one sensor, in response to the request for the report on whether the ACP information is included in the at least one sensor; and
transmitting a report on an ACP information list to the service server.

10. The control method of claim 9, further comprising:
receiving a request for a report on all ACP information found by the service server; and
transmitting, to the at least one sensor, the request for the report on all the ACP information.

11. The control method of claim 10, further comprising:
receiving an ACP information record report of each of the at least one sensor from each of the at least one sensor; and
collecting the ACP information record report and transmitting the collected ACP information record report to the service server.

12. The control method of claim 11, further comprising:
receiving an ACP service start request from the service server; and
transmitting an ACP service mode entry request to the at least one sensor.

13. The control method of claim 12, further comprising:
receiving an ACP service start notification from the at least one sensor;
transmitting the ACP service start notification to the service server; and
starting an ACP service.

14. A control method of a sensor communicating with a gateway communicating with a service server, the control method comprising:
sensing first information comprising at least one of bioinformation, disaster prevention information, and public information;
transmitting the first information to the gateway;
receiving a control command relayed by the gateway from the service server, the control command being used to control the sensor;
controlling the sensor based on the control command;
receiving, from the gateway, a request for a report on whether adaptive control protocol ACP information is included in the sensor; and
transmitting, to the gateway, a report on whether the sensor has an ACP of the sensor, in response to the request for the report on whether the ACP information is included in the sensor.

15. The control method of claim 14, further comprising:
registering the sensor in the gateway based on registration information comprising at least one of a version of an adaptive control protocol (ACP), a name and a type of the sensor, a gateway interface type, identification information, initial setup information, authentication information, and right information.

16. The control method of claim 14, further comprising:
receiving, from the gateway, a request for a report on ACP information found by the service server; and
transmitting, to the gateway, an ACP information record report of the sensor, in response to the request for the report on the ACP information.

17. The control method of claim 16, further comprising:
receiving an ACP service mode entry request from the gateway;
transmitting an ACP service start notification to the gateway;
transmitting the ACP service start notification to the service server; and
starting an ACP service.

18. A gateway configured to communicate with at least one sensor and a service server, the gateway comprising:
a communication unit to receive, from the at least one sensor, first information comprising at least one of bioinformation, disaster prevention information, and public information; and
a controller to control the communication unit to transmit the first information to the service server when the first information meets a first standard, or to process the first information in a data format of the first standard and to transmit the processed first information to the service server when the first information does not meet the first standard,
wherein the communication unit is configured to receive, from the service server, a control command to control the at least one sensor, and configured to transmit the control command to a sensor corresponding to the control command,
wherein the gateway is configured to transmit to the sensor, via the communication unit, a request for a report on whether adaptive control protocol (ACP) information is included in the sensor based on receiving a query regarding the ACP information in the sensor from the service server.

19. A sensor configured to communicate with a gateway communicating with a service server, the sensor comprising:
a sensing unit to sense first information comprising at least one of bioinformation, disaster prevention information, and public information;
a communication unit to transmit the first information to the gateway, and to receive a control command relayed by the gateway from the service server, the control command being used to control the sensor; and
a controller to control the sensor based on the control command,
wherein the sensor is configured to transmit to the gateway, via the communication unit, a report on whether adaptive control protocol (ACP) information is included in the sensor based on receiving a query regarding the ACP information in the sensor from the service server via the gateway.

* * * * *